No. 873,339. PATENTED DEC. 10, 1907.
G. A. BADER.
NOSE GUARD FOR EYEGLASSES.
APPLICATION FILED AUG. 29, 1906.
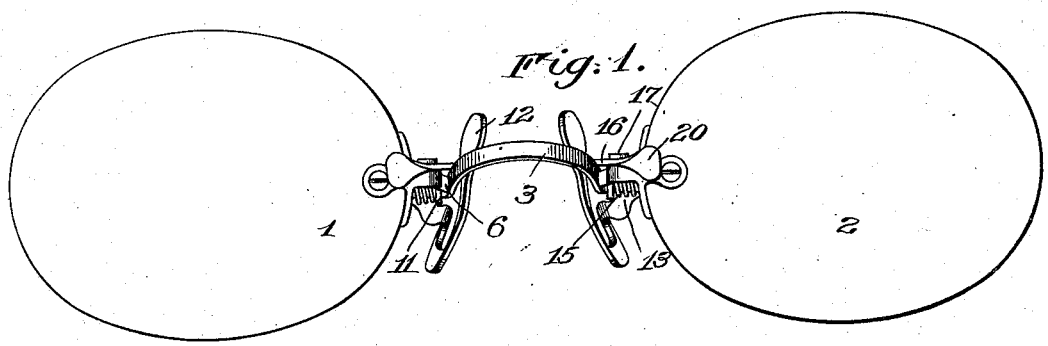
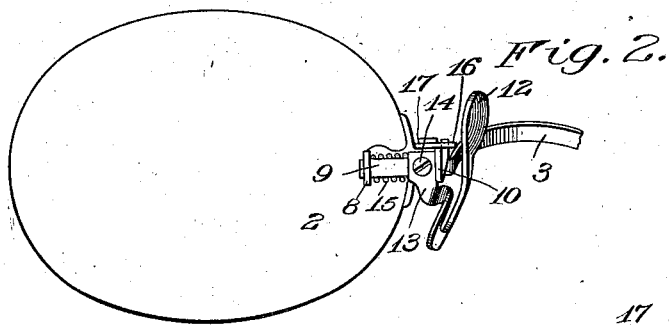
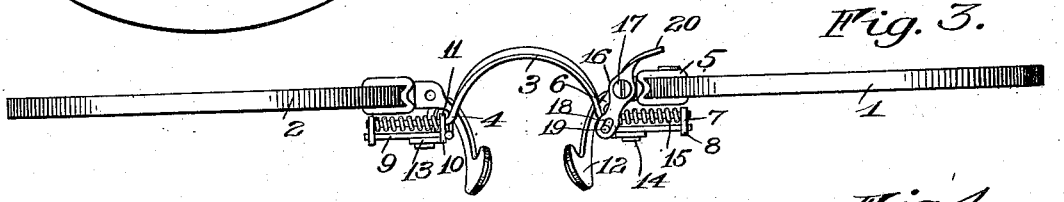
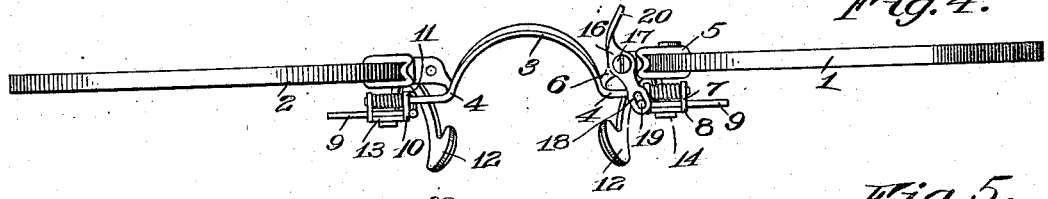
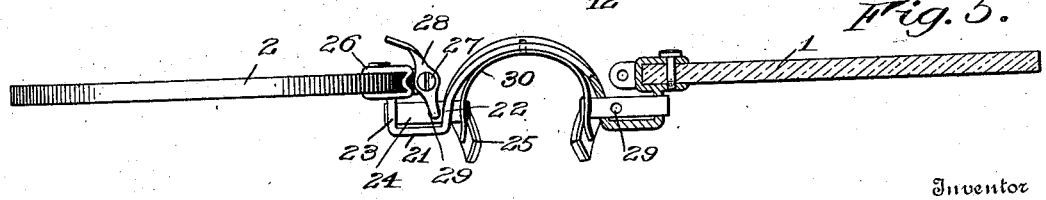
Witnesses
Walter B. Payne
Florence E. Franck
Inventor
Gustav A. Bader
By Church & Rich
his Attorneys

UNITED STATES PATENT OFFICE.

GUSTAV A. BADER, OF ROCHESTER, NEW YORK, ASSIGNOR, BY DIRECT AND MESNE ASSIGNMENTS, OF ONE-HALF TO E. KIRSTEIN SONS COMPANY, OF ROCHESTER, NEW YORK, A CORPORATION OF NEW YORK, AND ONE-HALF TO LEO F. ADT, OF ALBANY, NEW YORK.

NOSE-GUARD FOR EYEGLASSES.

No. 873,339.　　　Specification of Letters Patent.　　　Patented Dec. 10, 1907.

Application filed August 29, 1906. Serial No. 332,433.

*To all whom it may concern:*

Be it known that I, GUSTAV A. BADER, of Rochester, in the county of Monroe and State of New York, have invented certain new and useful Improvements in Nose-Guards for Eyeglasses; and I do hereby declare the following to be a full, clear, and exact description of the same, reference being had to the accompanying drawings, forming a part of the specification, and to the reference-numerals marked thereon.

My present invention relates to improvements in eyeglasses, and more especially to those of the type employing a substantially rigid bridge and relatively movable nose guards adapted to engage the wearer's nose to hold the eyeglasses positioned thereon, and the object of the invention is to provide a device of this kind wherein the nose guards are guided to move substantially in line with one another, so that the relation of the nose-engaging surfaces of the guards will not be altered while the guards occupy different positions of adjustment, and furthermore, to provide devices for enabling nose guards of the kind described, to be adjusted easily and conveniently.

To these and other ends the invention consists in certain improvements and combinations of parts all as will be hereinafter more fully explained, the novel features being pointed out in the claims at the end of the specification.

In the drawings: Figure 1 is a front elevation of a pair of nose guards constructed in accordance with my invention. Fig. 2 is a rear view of a portion of the mounting. Figs. 3 and 4 are plan views of the mounting, showing the nose guard in open and closed positions respectively, and Fig. 5 shows another form of mounting constructed in accordance with my invention.

Similar reference numerals in the several figures indicate similar parts.

In those types of eyeglasses employing a relatively yielding or resilient bridge adapted to be flexed to open and close the nose guards, as well as those having the guards pivoted thereon, the relation of the nose-engaging surfaces of the guards is altered at each different position of adjustment thereof, and while the inclination or angle of the guards may correspond with the slant of the sides of the nose when the guards are fitted thereon in one position, there will be a variation in the angles of the nose guard and the sides of the nose in case the guards happen to be fitted thereon at a different point, and this adjustable feature is avoided by the present invention.

The mounting shown in Figs. 1—4 inclusive embodies the usual lenses 1 and 2 having preferably rigid bridge 3 extending between their inner edges, the ends of this bridge extending in rear of the plane of the lenses, and thence extending outwardly in alinement and in opposite directions in a plane in rear of the lenses to form the guides 4 at each end thereof.

On the inner edge of each lens is fitted a suitable attaching device 5, each of these attaching devices being rigidly secured to the bridge at points intermediate the central portion thereof and the guides, by the lugs 6, and on the outer end of each of these guides of the bridge is secured a bearing lug 7 having a rearward extension 8 provided with a bearing aperture, preferably angular in outline, to receive a slide 9 having a corresponding outline, and the inner end of each slide is, in turn, provided with a corresponding bearing lug 10 having a forward extension 11 provided with a bearing aperture to slidingly receive the corresponding guide formed on the bridge, these guides being preferably angular or rectangular in cross section and the apertures in the bearing lugs being correspondingly formed to insure a close fit that will prevent relative rotation between these parts.

The nose guards 12 are secured preferably in fixed relation on their corresponding slides 9, the nose guards shown in the present instance being of an ordinary form, and having its attaching lug 13 suitably twisted to lie flatwise against the rear surface of the slide where it is suitably secured, such as by a fastening screw 14, the nose-engaging surfaces of the guards being suitably set or adjusted to correspond to the surfaces they are adapted to engage on the wearer's nose. It is preferable that these guards should automatically engage and obtain the requisite hold against the wearer's nose, and to accomplish this result, it is preferable to provide a helical spring 15 on each of the guides on the bridge and having its ends resting against the bearing lugs 7 and 10 on the bridge and slide respectively, the normal tendency of this spring to expand serving to proximate the nose guards and produce a clamping action on the nose when interposed between them, the lugs 7 connecting the bridge and the attaching devices serving as stops for limiting the inward movement of the guards under the action of the springs.

In the present instance, the nose guards are operated by levers 16 having finger-engaging portions at their forward ends adapted to be grasped and pressed together by the thumb and forefinger of the wearer in applying and removing the eyeglasses, each lever having a screw 17 for pivotally connecting it to its corresponding attaching device on the lens, and at its rear end it has an aperture 18 preferably in the form of a radial slot, and adapted to receive a projection 19 on the slide carrying the nose guard, the forward ends of the levers preferably extending forward of the plane of the lenses and being suitably formed to provide finger grips 20.

As the finger grips on the guard operating lenses are pressed together, their rear ends coöperating with the slides will move the latter outwardly to produce a separation of the guards to enable the eyeglasses to be fitted to, or removed from the wearer's nose, the operating springs being compressed between the bearing lugs on the bridge and slides respectively, and when the finger grips are released, these springs serve to automatically proximate the nose guards, and bring them into proper engagement with the wearer's nose.

In the mounting shown in Fig. 5 the bridge has its ends formed into loops or doubled portions 21 arranged preferably in rear of the plane of the lenses, the inner and outer arms 22 and 23 of each loop being provided with a bearing aperture adapted to serve as guides for the slide 24 having the nose-guard 25 secured at its inner end, this slide being preferably rectangular or otherwise angular in cross section and the guiding apertures being formed to correspond in order to prevent relative rotation of the slide and the nose guard attached to it. Each end of the bridge is secured to a suitable attaching device 26, the latter in turn being fastened to the lens, and each attaching device is provided with an inward extension adapted to receive a pivot screw 27 for the guard-operating lever 28, the latter being suitably formed to enable it to be operated by the wearer's finger, and having its rear end bent downwardly and arranged to coöperate with an aperture 29 formed in the slide 24, operation of the lever serving to proximate and separate the nose guards. The nose guards in this form of the invention are also automatic in operation, that is to say, they are arranged to move into engagement with the wearer's nose when the operating levers are released, and this is accomplished by a spring 30, one spring preferably serving to operate both guards, the spring being soldered or otherwise secured to the inner surface of the arched or intermediate portion of the bridge, the ends of this spring engaging the guards or the slides to which they are attached, and by its action, normally operating to proximate the guards. The arms of this spring for some distance back from its ends are left free or detached from the bridge so as to permit the requisite movement thereof, and these unattached portions of the spring are formed with a curvature having shorter radii than the arched or curved portion of the bridge which they rest opposite to, and, as the guards are separated, these spring arms have a rolling motion on the bridge which serves to distribute the bending action on the spring and thus prevent breakage.

Eyeglasses constructed in accordance with my invention do not require frequent adjustment of the noseguards in order for them to properly fit the wearer's nose, as the relative movement of the guards is substantially in alinement with one another and therefore the relation of the nose-engaging portions of the guards will not be disturbed by the different positions occupied by the guards, and by providing the operating levers having finger grips for operating the guards, the desired leverage may be obtained to insure an ease of movement of the guards. Moreover, the present invention enables the lenses to be firmly secured in fixed relation, and therefore the optical relations thereof cannot be disturbed as in those types of eyeglasses employing a resilient or spring bridge or other loose or yielding connections between the lenses.

By arranging the guides on the bridge substantially in line with the optical centers of the lenses, and attaching the slides to the nose guards at intermediate points thereof, the slides and bearings are subjected to the least friction and strain, as there are no forces tending to tilt the guards out of their proper line of movement, and this enables the guards to be easily operated by the finger grips and avoids undue wear of the moving parts.

I claim as my invention:

1. In eyeglasses, the combination with the lenses and a bridge for connecting them, of nose guards, guides on which the nose guards move substantially in line with one another, and pivoted levers for operating the guards on their guides.

2. In eyeglasses, the combination with the lenses, of a rigid bridge connecting them and having guiding portions formed thereon behind the lenses, of nose guards mounted to operate substantially in line with one another on said guiding portions.

3. In eyeglasses, the combination with the lenses having suitable attaching devices thereon, and a bridge connecting the lenses, of guides extending outwardly beyond the inner edges of the lenses and behind the said attaching devices, and nose guards having portions coöperating with said guides to insure movement of the nose guards substantially in line between the centers of the lenses and in a direction parallel to the plane of the lens surfaces.

4. In eyeglasses, the combination with the lenses, and a bridge for connecting them, of nose guards, guides for insuring relative movement of the guards in line with one another, and pivoted levers having finger grips at their forward ends and having suitable connection with the guards for operating the latter.

5. In eyeglasses, the combination with the lenses, the attaching devices thereon, the bridge connected to the attaching devices and having the extensions in line with and in rear of said devices, of slides operating on said extensions and nose guards carried by the slides.

6. In eyeglasses, the combination with the lenses and a bridge connecting the proximate edges of the lenses, of bearings extending outwardly from the bridge, slides mounted on said bearings to move in straight lines only in a direction parallel with the planes of the lenses, and nose guards carried by the slides.

7. In eyeglasses, the combination with the lenses having suitable attaching devices thereon, of a bridge connected to said attaching devices and having guiding portions extending in rear thereof, nose guards guided to operate on said guiding portions, and operating levers pivoted on the attaching devices and operatively connected to their respective guards, the forward ends of said levers being provided with finger grips.

8. In eyeglasses, the combination with the lenses, of a bridge rigidly attached to the lenses and having guides extending outwardly beyond the points of attachment and in line with one another, and nose guards mounted to operate longitudinally on said guides.

9. In eyeglasses, the combination with the lenses, of a bridge rigidly attached to the lenses and having guides extending outwardly in rear of the lenses, nose guards, slides connected to the nose guards, and bearings on the guides and slides respectively for guiding the movement of the latter.

10. In eyeglasses, the combination with the lenses, of a bridge rigidly attached thereto and having horizontal guides extending in a direction parallel to the plane of the lenses, nose guards, slides carrying the nose guards, bearing lugs on the guides and slides respectively for guiding the movement of the nose guards, and helical springs encircling the guides between the said bearing lugs.

11. The combination with the lens clamps, the bridge connected thereto having the extensions and the perforated guide plate at its ends, of the slides having the plates sliding on the extensions and the portions extending through the perforated guides, the springs between the plates and nose guards connected to the slides.

12. The combination with the bridge having the arched central portion, the lens clamps thereon and the extensions in rear of said clamps, of the slides guided on the extensions to move in straight lines only, springs for operating the slides inwardly and the nose guards detachably connected to the slides.

GUSTAV A. BADER.

Witnesses:
G. WILLARD RICH,
WALTER B. PAYNE.